Patented Dec. 24, 1940

2,226,299

UNITED STATES PATENT OFFICE 2,226,299

MOLDED ELECTRIC INSULATING ARTICLE

Ernst Albers-Schönberg, Berlin-Frohnau, Germany, assignor to Steatit-Magnesia Aktiengesellschaft, Berlin-Pankow, Germany No Drawing. Application September 21, 1934, Serial No. 744,961. In Germany September 27, 1933

7 Claims. (Cl. 106—12)

This invention relates to molded ceramic dielectric for an electric condenser, and has for its object to employ a ceramic mass of special composition in producing such molded dielectrics, particularly those that are densely sintered.

According to the invention, molded insulating articles of this class are made from a ceramic mass possessing an extraordinarily high dielectric constant whereby it becomes possible to overcome the constructional difficulties which were involved hitherto when the known inorganic insulating substances with their low dielectric constants had to be used for producing insulating parts of great capacity. The dielectric constants of most of the known inorganic insulating substances have values lying between 3 and 8; mica, for instance, has 7; steatite, 6; quartz glass, 3, etc. For example, if the difficulties mentioned are to be eliminated in a condenser plate by reducing wall thickness, manufacturing complications will arise and, in addition, disruptive strength will be lowered in a highly undesirable way.

It has been found that the dielectric constant of ceramic masses, particularly of sintered masses, can be extraordinarily increased by adding to them titanium dioxide in chemical or mineral form, especially if the amount added is raised to 30% and more. The remaining part of the mass may consist, in the main, either of clay substance or talc or steatite, and talc and clay may simultaneously be present in the mass. The invention can be applied in a particularly advantageous manner to masses built up with an ample share of talc or soapstone which exceeds in quantity the clay constituent, as the very low dielectric loss of the steatite-like addition, especially in alkali-free mixtures, becomes apparent also in mixtures containing titanium dioxide. This affords an opportunity of producing substances combining high capacity with low dielectric loss.

The following examples recite mixtures adapted to produce densely sintered molded electric insulating articles according to the invention and particularly suitable for dielectrics for condensers, and state also the dielectric constants and losses:

*Example 1*

| | Parts |
|---|---|
| Rutile | 70 |
| Wildstein blue clay | 30 |
| Dielectric constant | approx. 35 |
| Dielectric loss | tgδ=approx. 150.10⁻⁴ |

*Example 2*

| | Parts |
|---|---|
| Titanic acid (techn.) | 80 |
| Wildstein blue clay | 15 |
| Soapstone | 5 |
| Dielectric constant | approx. 60 |
| Dielectric loss | tgδ=approx. 40.10⁻⁴ |

*Example 3*

| | Parts |
|---|---|
| Soapstone | 58 |
| Rutile | 32 |
| Wildstein blue clay | 6.5 |
| Calc-spar | 3.5 |
| Dielectric constant | approx. 15 |
| Dielectric loss | tgδ=8–9.10⁻⁴ |

*Example 4*

| | Parts |
|---|---|
| Titanic acid (techn.) | 75 |
| Soapstone | 20 |
| Blue clay | 3 |
| Ba-carbonate | 2 |
| Dielectric constant | 40 |
| Dielectric loss | tgδ=approx. 20.10⁻⁴ |

The invention is not restricted to the mixtures described in detail above, but may be varied in many ways without exceeding its scope.

I claim:

1. A ceramic dielectric of high dielectric constant and low dielectric loss consisting of a dense fired mixture containing at least 30 per cent titanium dioxide and a remainder containing clay substances.

2. A ceramic dielectric consisting of a dense fired mixture containing at least 30 per cent titanium dioxide and a remainder containing magnesium silicates such as talc and soapstone and being substantially free from compounds of alakali metal oxides.

3. A ceramic dielectric consisting of a dense fired mixture containing at least 30 per cent titanium dioxide and a remainder containing clay substances and magnesium silicates such as talc and soapstone and being substantially free from compounds of alkali metal oxides.

4. A ceramic dielectric according to claim 1, the content of titanium dioxide being at least 70 per cent.

5. A ceramic dielectric according to claim 1, the remainder containing fluxes substantially in the form of alkaline earth metal compounds.

6. A ceramic dielectric according to claim 2, the remainder containing fluxes substantially in the form of alkaline earth metal compounds.

7. A ceramic dielectric according to claim 3, the remainder containing fluxes substantially in the form of alkaline earth metal compounds.

E. ALBERS-SCHÖNBERG.